United States Patent [19]

Schneiderhan

[11] Patent Number: 5,276,628
[45] Date of Patent: Jan. 4, 1994

[54] APPARATUS AND METHOD FOR MONITORING AND CONTROLLING PRINTED SHEET ITEMS FOR POST-FINISHING

[75] Inventor: Edward M. Schneiderhan, Glenview, Ill.

[73] Assignee: Johnson & Quin, Inc., Niles, Ill.

[21] Appl. No.: 965,060

[22] Filed: Oct. 22, 1992

Related U.S. Application Data

[63] Continuation of Ser. No. 609,477, Nov. 5, 1990, abandoned.

[51] Int. Cl.$^5$ .............................................. G06F 15/20
[52] U.S. Cl. ..................................... 364/478; 271/259
[58] Field of Search ................ 364/478, 570; 324/667, 324/668, 689; 217/263; 209/603; 235/379; 270/58, 52, 53, 54, 55; 271/256, 259; 53/493

[56] References Cited

U.S. PATENT DOCUMENTS

| | | |
|---|---|---|
| 3,586,972 | 6/1971 | Tulleners .............................. 324/688 |
| 3,842,402 | 10/1974 | Ett et al. . |
| 3,873,972 | 3/1975 | Levine . |
| 3,899,165 | 8/1975 | Abram et al. . |
| 4,115,981 | 9/1978 | Hell et al. . |
| 4,121,818 | 10/1978 | Riley et al. . |
| 4,299,073 | 11/1981 | Golicz et al. . |
| 4,429,217 | 1/1984 | Hill et al. . |
| 4,525,788 | 6/1985 | Gottlieb et al. . |
| 4,527,790 | 7/1985 | Piotroski . |
| 4,547,856 | 10/1985 | Piotroski et al. . |
| 4,574,692 | 3/1986 | Wahli . |
| 4,707,790 | 11/1987 | Gomes et al. . |
| 4,733,359 | 3/1988 | Luperti et al. . |
| 4,739,606 | 4/1988 | Cantile . |
| 4,753,430 | 6/1988 | Rowe et al. . |
| 4,791,353 | 12/1988 | Typpo ................................... 324/667 |
| 4,797,832 | 1/1989 | Axelrod et al. . |
| 4,799,661 | 1/1989 | Nail . |
| 4,800,505 | 1/1989 | Axelrod et al. . |
| 4,812,982 | 3/1989 | PeBenhofer . |
| 4,831,657 | 4/1989 | Casey et al. . |
| 4,852,013 | 7/1989 | Durst, Jr. et al. . |
| 4,853,882 | 8/1989 | Marshall ............................... 364/570 |

*Primary Examiner*—Jerry Smith
*Assistant Examiner*—Jim Trammell
*Attorney, Agent, or Firm*—Leydig, Voit & Mayer

[57] ABSTRACT

A document control and audit apparatus to monitor, control and audit documents printed by a non-impact printer for detecting missing pages, duplicate pages, and double or multiple pages. The document control and audit apparatus ensures that the proper number and sequence of pages or forms are included in a printed report or document and maintains detailed information of the contents of the individual documents, thereby providing a real time record or account and final record of the activities which occurred during the printing process. The document control and audit apparatus includes a video camera and a number of optical sensors for sensing the location and position of the pages as the pages pass through the document control and audit apparatus.

8 Claims, 5 Drawing Sheets

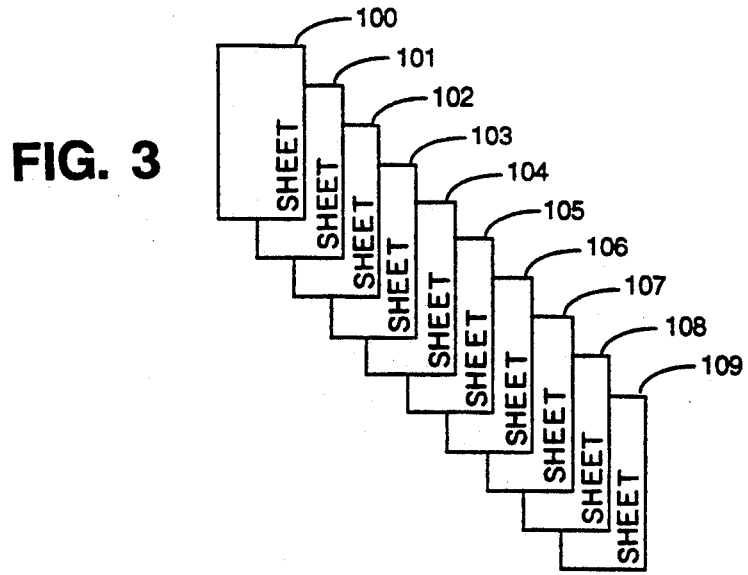
FIG. 3
FIG. 4A
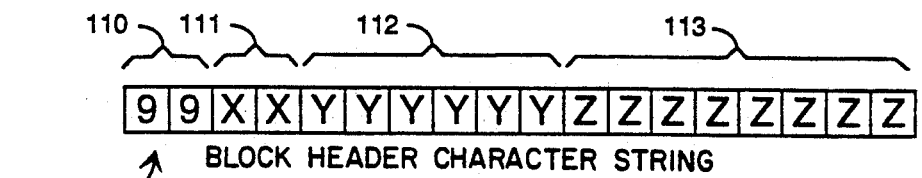
BLOCK HEADER CHARACTER STRING
FIG. 4B
BATCH HEADER CHARACTER STRING
FIG. 4C
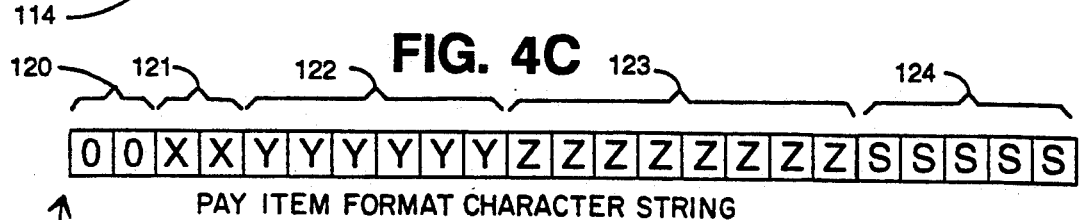
PAY ITEM FORMAT CHARACTER STRING
FIG. 4D
BATCH TRAILER CHARACTER STRING
FIG. 4E
BLOCK TRAILER CHARACTER STRING

APPARATUS AND METHOD FOR MONITORING AND CONTROLLING PRINTED SHEET ITEMS FOR POST-FINISHING

This is a continuation of copending application Ser. No. 07/609,477, filed on Nov. 5,1990, now abandoned.

FIELD OF THE INVENTION

The present invention relates generally to the production of documents by non-impact printers. More particularly, the present invention provides for the detection of missing pages, duplicate pages, and double pages which occur during the production of these documents. The document control and audit apparatus and method ensures that the proper number of pages are contained in the document when sent to the proper individuals.

BACKGROUND OF THE INVENTION

Any number of businesses regularly send printed information to their clients or customers. Recently, the introduction of the non-impact printer has allowed for easier production of these documents. The non-impact printer introduced the concept of producing documents which can be personalized to the individual customer or client. This not only improved the visual appeal of the document being sent to the customer, but also improved the accuracy of the information which the document contains. The non-impact electronic printer creates documents which look as if they are created for each individual customer or client.

Because the non-impact printer has provided for flexibility in printing, numerous applications have arisen. These applications include multiple-page letters, billing statement, dividend notices, and checks, including payroll, accounts payables, and monthly disability payments. In all of these cases, one general feature is a degree of personalization which is applied to all of the documents. Consequently, because of the attractiveness of the non-impact printer in producing custom documents, a second industry began to develop which is called post-finishing.

Post-finishing is the process which is applied to the output from the non-impact printer Depending on the application, a number of procedures, or applications are performed on each individual document For instance, these procedures can include collating, which is collecting a number of printed pages in a set; stapling, which is binding the set of printed pages within a document together; gluing, which would be used to form a personalized envelope, a self-mailer, or a bound set; folding, preparing the printed output pages for insertion into an envelope or other container; and slitting, which is a means to obtain two or more forms from a single printed sheet. Any one or all of these procedures may be required to produce the desired final product.

Today, the user of the non-impact printer creating these documents achieves substantial savings and increased productivity by combining the printing operations and the post-finishing operations. This process requires that the post-finishing equipment be connected serially or more commonly referred to as in-line with the printing devices. Before any of these post-finishing processes can be started however, the printed output taken from the non-impact printer must be correct.

One of the more popular uses for the non-impact printer is in the direct-mail industry. With non-impact printing, a high degree of personalization is obtained thereby creating a substantial marketing tool. As the typical direct mail package or document is made up of a number of individually personalized pieces or pages, each one of these individualized pages needs to be accurate in not only its content but in the number of pages contained within the package itself Each individual page of the entire document is usually a pre-printed form. These pre-printed pages are then sent through the non-impact printer to add additional information which is specifically directed toward the individual customer.

The introduction of the non-impact printer has also improved documents produced by major credit card companies, banks and other industries which rely on individualized information sent on a regular basis to their customers. It is particularly important to these individuals that the information contained within the package contains the proper number of pages designated to be included in the document. In particular, credit card companies and banks produce enormous numbers of documents, each document containing information concerning the personal balance of individual accounts.

The banking industry and insurance industry is a major user of the non-impact printer to produce information that is sent on a monthly basis to an individual customer who has an account with the bank. The information sent to the individual client contains a number of pages which can include information concerning check numbers, amounts of checks, and to whom the check is made out. In these situations, it is critical that the document sent does not contain duplicate pages, missing pages, or double pages.

The development of magnetic toner allowed the non-impact printer to be used in the production of checks. Major companies began printing their payroll and accounts payable checks on these electronic printing systems. In these applications, the problems of doubles, duplicates, missing pages and unprinted pages, becomes catastrophic. A missing check is an employee not paid or a payment not made. A double is a payment and blank check. A duplicate is the same as making a double payment. The potential for fraudulent use of the non-impact printing of checks is an auditor's nightmare.

With the introduction of the non-impact printer, as many copies of a single page can be created as needed with the same and typically superior print quality While the non-impact printer resolved many of the problems that were inherent in other printers, including impact printers, the non-impact printer still has a few problems. These problems are inherent to the non-impact printer and the cut sheet non-impact printer.

These problems can include the occasional missing page usually produced by operator error, the duplicate page which appears to be a difficult problem to solve in the non-impact printer, the piggy-back page or double which is caused by feeding two forms at the same time, and a page which has no printing printed on it, the unprinted page.

With the types of applications mentioned previously, for which the non-impact printer is used today, specifically, check statements and other legally sensitive documents, these problems have a greater impact than when they occur in direct-mail advertising. For example, a missing page from a bank statement or a telephone bill causes concern to the customer about the balance of his account or the amount of his bill. A duplicate page or a blank page causes similar problems Not only do these problems create anxiety for a customer, they are also an embarassment to the producer of the individual documents.

SUMMARY OF THE INVENTION

Accordingly, it is a principle object of the present invention to provide an apparatus and method for assembling multiple pages of a document. More specifically, it is an object of the present invention to provide a document control and audit apparatus and method for determining where the printed document has missing pages, duplicate pages, double pages, unprinted pages and the like.

Another object of the present invention is to provide accurate and complete mailings, from advertising agencies, banks, credit card companies and other industries which require personalized mailing containing confidential or highly important information.

It is still another object of the present invention to maintain a running tally of the documents as they flow through the post-finishing process so that an operator can tell where errors have occurred.

The foregoing and other objects are accomplished by providing a document control and audit apparatus and a method which can take printed pages from a non-impact printer and determine whether or not the individual pages produced by the non-impact printer are contained therein. Typically, a document produced by a non-impact printer will contain more than one page per document and it is critical that all of the pages are in the proper sequence and present in the correct quantity. The present invention is used to detect the occurrence of a double, duplicate, missing and unprinted page. The present invention also provides a visual display, and a hard copy of these occurrences so that operators can correct the errors during the execution of the document production. Also included are provisions for user specific application oriented functions.

The present invention also provides a method to control and to monitor the documents as they are produced and to pass these documents and the appropriate information to in-line finishing equipment. The information generated is specific to the finishing of each printed page and to the entire document so that once the entire document has been completed, the document can be inserted into the proper package or envelope and sent to the appropriate location.

BRIEF DESCRIPTION OF THE DRAWINGS

FIG. 3 is an illustration of the sequence of control and custo of documents.

FIG. 4A is an illustration of a block header character string and a block header format used in the present invention.

FIG. 4B is an illustration of a batch header character string and a batch header format used in the present invention.

FIG. 4C is an illustration of the control word for individual pay items to maintain proper document control.

FIG. 4D is an illustration of a batch trailer control word and the format for the batch trailer control word used in the present invention.

FIG. 4E is an illustration of a block trailer control word and the format for the block trailer control word used in the present invention.

DETAILED DESCRIPTIONS

Figure 1:
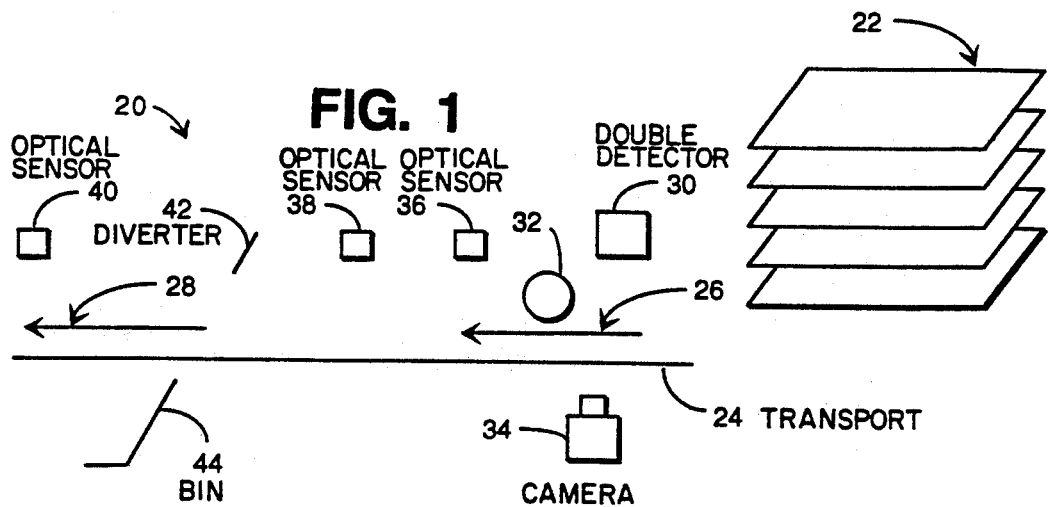
FIG. 1 is a schematic illustration of a document control and audit apparatus showing the hardware for proper document control.

Referring now to the drawings and more particularly to FIG. 1, FIG. 1 illustrates schematically a document control and audit apparatus 20.

The document control and audit apparatus 20 receives a single page, sheet, or item shown here as a stack of documents 22 which have been produced by a non-impact printer which is not shown. The individual pages of the stack of documents 22 travel along a document transport 24 in the direction of an arrow 26 and an arrow 28. The document transport 24 indicates the path taken by the items as they are carried by a transport mechanism from one post-finishing operation to another. The arrows 26 and 28 represent the direction of documents through the in-line finishing equipment which includes a double detector 30. The in-line finishing equipment performs post-finishing procedures including those post-finishing procedures previously described.

The double detector (DD) 30 uses a capacitor to detect whether or not there is more than one page received at a time from the stack of documents 22 as they enter the apparatus 20. The capacitance of the capacitor contained within the double detector 30 is a function in the distance between the capacitor plates and the medium of the gap between these plates. For instance, the capacitance is one value if the medium between the plates of the capacitor is air. It is another value if the sheet of paper is placed between the plates and still another value if two sheets are placed between each of the capacitor plates. By measuring the capacitance between the plates of the capacitor, the number of individual sheets can be determined. The techniques of capacitance measurement are well known by those skilled in the art.

The double detector 30 receives the capacitance value from the capacitor and sends this information to an interface which will be described later. The use of the capacitor in the double detector 30 is appropriate here because the opacity of the paper, the preprinted ink coverage and toner or printer produced coverage does not dramatically affect the results of the capacitive measurement technique. Consequently, the measurement of capacitance is a good indication of how many sheets of paper are passing through the double document 30. Also, contact measurement techniques are difficult to adjust and do not allow for applications where individual sheets of a document vary in thickness. In addition, contact measurement introduces a potential paper jam location.

An alignment device 32, is located after the double detector 30. The purpose of the alignment device 32 is to align the individual sheets of paper which are received from the stack of documents 22. Each item received from the stack of documents 22 is aligned along a common guide edge by the alignment element 32. The alignment element 32 ensures the position of the pages making sure that page position is correct for accurate reading by a camera 34. Consequently, the alignment device 32 need only be located before the camera 34.

The camera 34 is the camera portion of an optical character recognition system. The present embodiment of the invention uses video cameras constructed from charge coupled device (CCD) arrays. The optical character recognition system can recognize and generate information which indicates either the content of human readable characters or bar codes. One type of optical character recognition system for reading human readable characters is disclosed in copending application Apparatus and Method for Assembling Mass Mail Items, Ser. No. 07/481,480, now U.S. Pat. No. 5,067,088. The techniques of optical bar code recognition are not new and are understood by those who are skilled in the art. The camera 34 provides the means for recognizing the occurrence of missing pages, duplicate pages, out-of-sequence pages and the like by monitoring printed codes contained on the face of each page of a document. Additionally, other control information is read by the camera 34 and made available to a printer for access by an operator as described later.

A plurality of optical sensors 36, 38 and 40 are included along the document transport 24 for sensing the items as they travel through the post finishing equipment. The optical sensors can include linear CCD arrays arranged so that its row of cells is perpendicular to the transport motion. The optical sensors 36, 38 and 40 provide information indicating if the pages become jammed as they travel down the document transport 24. Each of the optical sensors is located in a pre-determined position along the document transport 24. The information the optical sensors provide will indicate a jam condition by location and also sequence number. The optical sensor 36 also provides a signal indicating a page is available for reading by the camera 34. The sequence number is reported in both a visual and a hard copy means thereby providing the auditing information of any documents which are later destroyed because they have been printed incorrectly or because they are duplicate or double documents. The number of sensors can vary depending on which operations are included in post-finishing.

A diverter 42 (DI) is used in conjunction with a bin 44 which is accessible to the operator who is running the system. The diverter 42 will force through control means any items which the operator or application specific software decides should not be included with the document or documents. The diverter 42 contains mechanical means which can include a paddle for diverting the items into the bin 44 where the operator can retrieve any documents diverted thereto.

All elements of the in-line finishing process can be monitored by the user through a cathode ray tube (CRT)/keyboard coupled to a central processing unit (CPU). The use of the CRT or computer display and terminal will be explained in more detail later.

Figure 2:
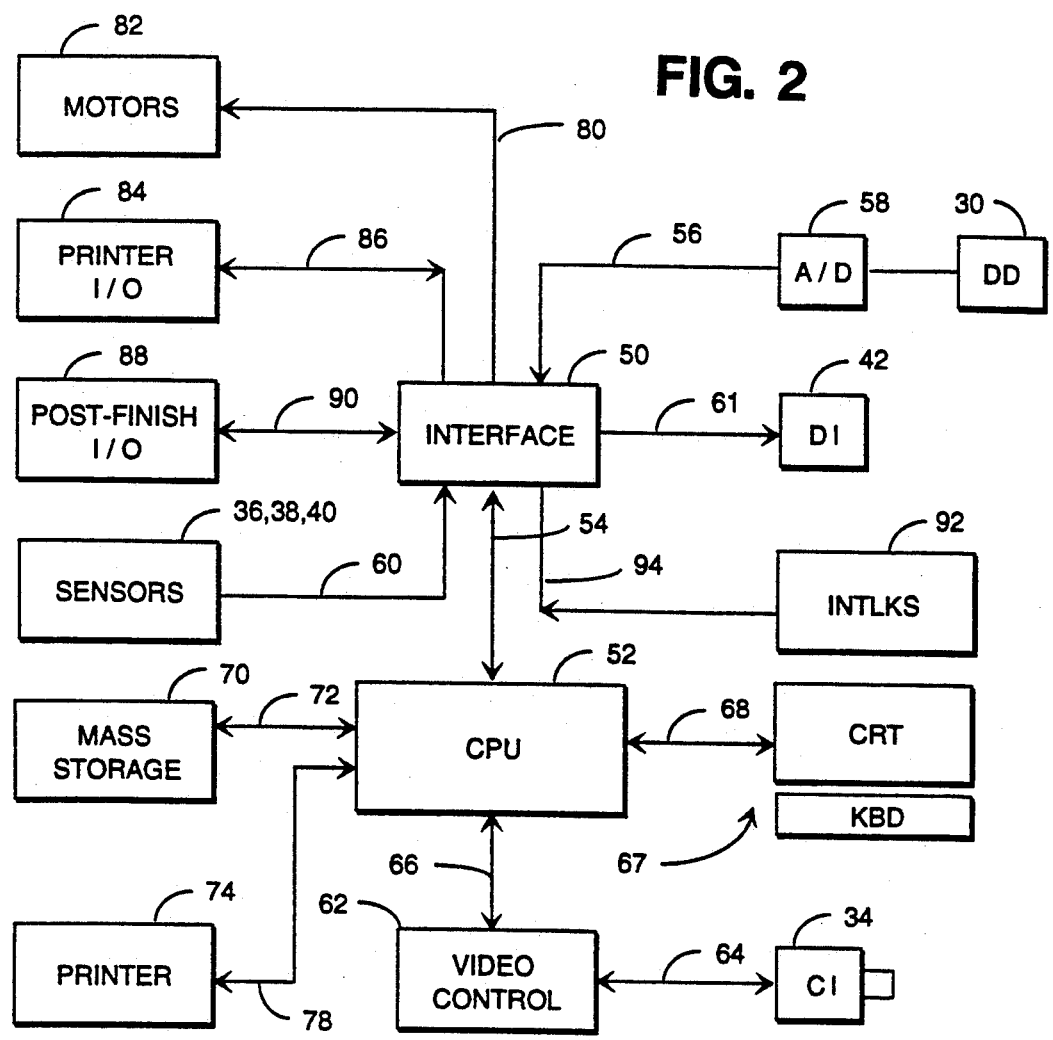
FIG. 2 is a schematic block diagram representing the electrical and electronic components of the system.

FIG. 2 is a schematic block diagram representation of the electrical and electronic component parts of the system. As previously described in FIG. 1, the double detector 30, the camera 34, and the optical sensors 36, 38, and 40 all provide signals which are important for monitoring the current flow of individual pages through the document control and audit apparatus 20.

An interface 50 is used to interface between the elements of the present invention, a number of other elements and a CPU or central processing unit 52. The interface 50 acts as a buffer between the external devices and others and the post-finishing interfaces coupled to post-finishing devices. Additionally, the interface 50 performs such functions as is necessary to convert signals received from the sensors 36, 38, and 40 and doubles detection signals received from the double detector 30. These signals are converted to binary logic level signals by the interface 50 for use by the CPU 52 as would be understood by one skilled in the art. Additional functions of the interface 50 include the detection of an opening in a hazard protection interlock circuit and motor control for the transport mechanism which carries items from one post-finishing operation to the next.

The CPU 52 is the controlling piece of electronics for the system. In the present embodiment, the CPU 52 consists of a microprocessor which is a 80386 microprocessor and can include other suitable equivalents. The CPU 52 functions to control all events within the document control and audit apparatus 20 and to pass and receive information from various other post-finishing system components. Additionally, the CPU 52 allows applications specific programs to be employed using the basic operating system. Consequently, customer specific functions can be performed based on the requirements of the individual customer.

The CPU 52 receives information from and sends information to the interface 50 over a line 54. The information received by the CPU 52 includes information received by the interface 50 from the double detector 30 and from the sensors 36, 38, and 40.

The double detector (DD) 30 is coupled to the interface 50 through a line 56 in which signal information travels in only one direction to the interface 50 through an analog to digital converter (AD) 58 which has converted the analog capacitance measurements received by the double detector 30 into digital form. The sensors 36, 38 and 40 are also coupled individually to the interface 50 but shown coupled here through a single line 60. Again, information flows from the sensors to the interface 50 in only one direction.

The diverter (DI) 42 is coupled to the interface 50 through a line 61. Control information flows between the diverter 42 and the interface 50 for diverting items.

The interface 50 relays information to the CPU 52 over the line 54. The CPU 52 is also receiving information from the camera 34 through a video control unit 62. The video control unit 62 acts as an interface between the camera 34 and the CPU 52. Information read by the camera 34 is sent through a line 64 through to the video control unit 62. The video control unit 62 takes the information received from the camera 34 and converts that information into usable signals to send to the CPU 52 through a line 66.

Additionally, the CPU 52 is controlled by the user through a CRT/keyboard (CRT/KBD) interface 67 through a line 68. The CRT/keyboard 67 not only provides information to the user so that the user can determine the current status of any individual pages of documents as they travel through the system but also allows the user to input key information and control information to the CPU 52 for controlling the document control and apparatus unit 20. The CPU 52 further obtains information received from the interface 50 and the video control unit 62 and stores that information in the mass storage unit 70. The mass storage unit 70 is coupled to the CPU through a line 72. The line 72 sends and receives information between the mass storage unit 70 and the CPU 52 upon prompts developed through the CPU 52 through the CRT/keyboard 67. A printer 74 is coupled to the CPU 52 through the line 78. The printer 74 provides a means for developing printed material which indicates the contents of the CPU and the information which has been derived throughout the system for control of the individual documents and the pages which are contained within those documents.

Based on information received from the CPU 52 and other elements within the document control and audit apparatus 20, the interface will send information over a line 80 to a plurality of motors 82. The motors 82 are used to drive the transport mechanism of the document transport 24 to transport items throughout the post-finishing operations. A printer input/output (I/O) 84 is coupled to the interface 50 through a line 86 as well as a post-finish input/output 88 coupled to the interface through a line 90. These two elements will be described in detail later.

A plurality of interlocks (INTLKS) 92 is coupled to the interface 50 through an appropriate number of lines shown here as line 94. The interlocks 92 are used as hazard protection interlocks for shutting down portions or all of the system as would be understood by those skilled in the art.

FIG. 3 illustrates one example of a sequence of the individual pages of a plurality of documents as they are created by the non-impact printer and sent down the document transport 24. This sequence of documents contains a number of control documents which allow the document control and audit apparatus 20 to monitor the information contained on the individual pages as the pages travel throughout the apparatus 20.

In the present embodiment, a string of characters is printed on each page of the document. This string of characters is used for control purposes and auditing purposes of the pages which make up the document. A portion of the character string used can be a sequence number which uniquely identifies each individual page in the printing sequence of the document. The sequence number allows for detection of missing and duplicate pages. Additionally included in this string is an identifier which is used to control document identification. Other information can be imprinted which includes dollar amount, number of pages to accumulate in a document and subsequent control information for in-line finishing equipment.

The sequence of documents illustrated in FIG. 3 contains the individual sheets or pages 100-109. The entire set of pages 100-109 represents what will be called a block. As an example, the pages 100-109 could apply to the production of checks. The entire number of sheets 100-109 contains the total number of checks which would be distributed by a company throughout its entire organization for one pay period. The payroll checks would be produced at a single corporate headquarters. The entire block would relate to a large group of documents to be processed. In this instance, the block will be the entire payroll to be produced for a current pay period.

The first sheet is a block header sheet 100. The document control and audit unit 20 reads this document with the camera 34. The first page of the entire set of documents 100 alerts the system that a particular block of information will follow and that it will contain information for one particular company. A block file is opened in the mass storage 70.

The second sheet is a batch header sheet 101. A batch is a smaller group of documents within the block. In this particular example, each batch is a payroll center such as one location of a certain facility within the entire organization. For instance, the company may have employees located in separate cities. In this case, the batch header document 101 indicates a batch of checks which will go to one particular location. A batch file is opened in the mass storage 70.

The individual sheets 102 and 103 represent individual checks made out to someone who works at the facility in the city just mentioned. Each of these checks will also have information contained on the check indicating the location to where the checks are going and other information to be described later.

The fifth sheet is a batch trailer sheet 104. The batch trailer sheet 104 indicates that this particular batch has been completed indicating that the information contained between sheet 101 and 104 is destined for a particular location within a larger group of locations. This batch trailer sheet 104 directs the CPU 52 to perform batch closing functions. When this occurs, the batch file is closed and various calculations can be made. In this case, the total dollar amount for each individual check might be calculated and compared to the originally specified accumulated dollar amount.

The sixth sheet is called a batch header sheet 105 as was the sheet 101. The batch header sheet 105 again performs the identical function as the sheet 101 in that it indicates that there is a new batch of documents which will correspond to another group of employees at a different location within the overall organization. The batch header sheet 105 will precede a plurality of individual sheets containing checks for each individual who works at this location. The sheets 106 and 107 are individual checks or payments which will be sent to individuals at the new location indicated by the information contained on sheet 105. As there are only two individuals in this example at this particular location, the file is completed by the batch trailer sheet 108. Its function is as previously described for the sheet 104 which was the batch trailer for a different location.

Once the entire organization and the individual checks have been completed, the entire set of documents is followed by a block trailer. The tenth sheet in FIG. 3 of this particular example is the block trailer sheet 109. This control document directs the CPU 52 to perform block closing functions which include calculating the total dollar amount for the entire organization and comparing it to the anticipated payroll for the week.

FIG. 4 illustrates the format for the various character strings or control words which appear on the sheets previously discussed in FIG. 3. FIG. 4A illustrates the format for a block header character string 109 found on the block header sheet 100. When the block header sheet 100 enters the document control unit and apparatus 20, the camera 34 reads this particular control word to obtain a variety of information. A first field 110 of the block header character string 109 contains the number 99. In the present embodiment, the number 99 is used as a code indicating to the document control and apparatus unit 20 that this is a block header sheet. Other characters than 99 can be used. The system, in particular the CPU 52, through information gained from the video control unit 62, uses this information to begin processing the information during the software functions related to the processing of block header data.

The second field of FIG. 4A, field 111, containing two Xs, indicates which pay period is involved. The third field 112, containing six Ys, illustrates the number of pays and the last field 113, containing eight Zs, contains the total dollar amount of this particular pay period for the entire organization or the entire block. Having read this information, the CPU 52 opens up a file in the mass storage device 70 which is identified by the data contained in the block header information of FIG. 4A. The block header is subsequently written to that file. All subsequent documents throughout the entire block will be written to this file until it is closed by the block trailer sheet 109. In this way, a record of each item and transaction type is recorded and retained for subsequent use during later analysis of the block or the batches contained within the blocks In the current embodiment, this file is called the "order entry file".

In the present system more than one block header sheet 100 is produced. For purposes of the ease of illustration in FIG. 3, only one initial block header sheet 100 has been shown, however, it is helpful to produce two of the block header sheets 100. The reason for this is that during the course of processing the individual sheets of the entire block some of those sheets will be rejected and others will be acceptable. By using two block header sheets, the document control and audit apparatus 20 can track both acceptable and rejectable items. The first block header sheet is sent to an output bin where all of the acceptable documents are sent. The other block header sheet is sent to the exception bin 44 where it identifies rejected documents and shows from what part of the overall sequence of documents that particular document came from. By doing this, it is easier to identify individual blocks or batches in either the acceptable output or the exception output bin. This aids in the reconciliation of any out-of-balance batches and subsequently the out-of-balance block.

When errors occur in control document processing, such as a missing control sheet or an extra control sheet, the non-impact printer is caused to stop if an in-line function is being performed. The operator is informed by the CRT of the CRT/keyboard 67 of the improper sequencing of these control documents. The error is also recorded in a file stored in the mass storage 70. Recovery procedures are now executed which are specific to the particular application used in the present embodiment by the operator before job processing can continue. In the present embodiment, in the event the control document error was due to a double document, processing is allowed to continue because this is not a catastrophic condition as control documents are not sent to customers. However, the occurrence of such an event is recorded in the file contained in the mass storage unit 70.

FIG. 4B illustrates the format of a batch header character string 114. The batch header character string 114 is essentially identical to the block header character string 109 with exceptions. One exception is the control document identifier 88 which is contained in the first field 115. This identifies the control sheet as a batch control sheet. The second field 116, containing two Xs, is used as a payroll center identifier instead of the pay period field as it appeared in FIG. 4A for the second field 111 illustrated. The third field 117, containing six Ys, and fourth field 118, containing eight Zs, indicate the number of payments and the total dollar amount respectively for this particular batch and not for the entire block as was done in FIG. 4A for the third field 112 and the fourth field 113. This particular batch header character string appears on the second sheet of FIG. 3 labeled 101.

In the example of FIG. 3, the batch header sheet 101 is followed by the third sheet 102 and the fourth sheet 103 which are the individual payment checks made out to individuals in the first location of the company in question. Each pay item 102 and 103 contains a pay item format word 119 which has a unique identifier. The pay item format word or character string 119 is shown in FIG. 4C illustrating a typical format for a pay item or a non-control document. The first item of the pay item format word 119, field 120, contains information signifying that this particular sheet is a pay item sheet. In this use, two Os are used. The second field 121 indicates the particular pay period that this check encompasses. The third field 122 is the employee number The forth field 123 contains the dollar amount paid to the individual and the fifth field 124 contains an item sequence number.

Once the pay item format word 119 has been read from the pay sheets by the camera 34, processed by the video control unit 62 and sent to the CPU 52 over the line 66, each particular pay item is appropriately added to the block file and to the batch file which exists in the mass storage unit 70. The dollar amount of each item processed is added to the batch and the block files. In particular to a pair of accumulators which are making a running tally of the total dollar amount for the block and the batch if there is no exception processing required because of duplicate, double or missing documents. If there are double, duplicate or missing documents, these items are accumulated separately in a separate file as exception items and they do not appear in the qualified output bin. To maintain proper access to these items, both the batch and block files have accumulators which indicate acceptable documents and unacceptable documents.

The block and batch files contain information regarding the final destination of each sheet. The sheet will be either output to the next particular process or directed to the exception bin if it should fall within one of the exceptions. If a missing item is detected, both the batch and block files record an identifier in the appropriate sequence, thereby indicating that the item is missing. The items are now tracked through the remainder of the system by location indicated by sensors 36, 38 and 40 and by block or item sequence number. If a jam occurs at any one of these sensors, the block and the batch files are appended to indicate the occurrence of a jam event. If the document is still within the system that is not in the exception bin or ejected from the document control unit, the files are written with location information. Additionally, the non-impact printer is caused to stop when operating in an in-line fashion so that the document position and jam information is presented to the operator so as to provide appropriate jam recovery information.

Figure 5:
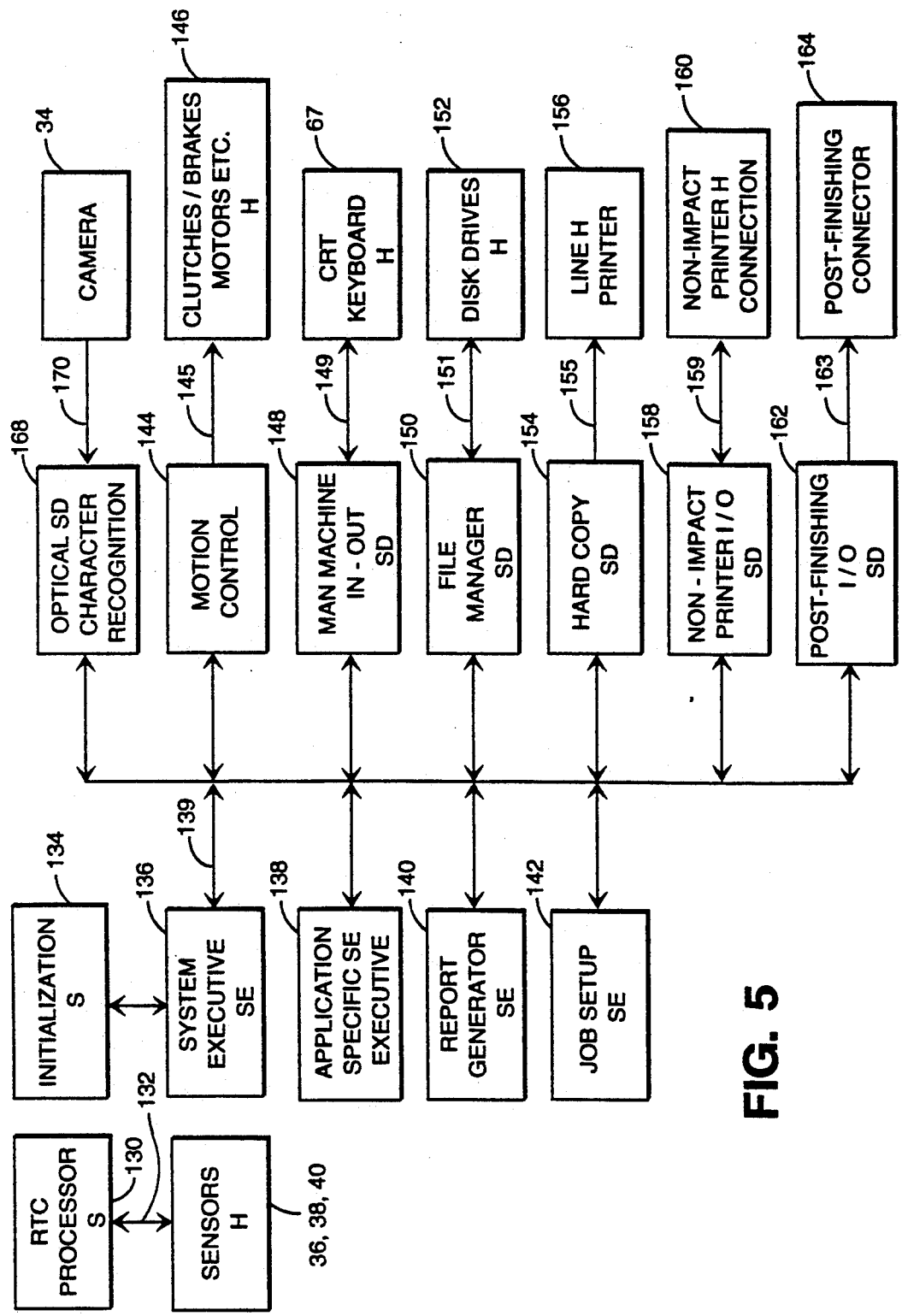
FIG. 5 is a block diagram of a plurality of software control modules and their relationship to the hardware elements.

FIG. 5 is a block diagram of a plurality software control modules and their relationship to the hardware elements. All of the control modules ending in S are software elements. All of the control modules ending in H are hardware elements. The control modules ending in SE are software executive elements and the control modules ending in SD are software driver elements.

A real time clock (RTC) processor 130 is a means to provide a fixed time base or measurement technique for use by the document control and audit apparatus 20. The document control and audit apparatus 20 uses the real time clock processor 130 to monitor the relationship between the position of the printed pages to the functioning of the software. The system is in effect a real time processing system. The RTC processor 130 uses information received from the sensors which include the sensors 36, 38 and 40 over a line 132. Because there is no control over the rate at which the non-impact printer delivers pages to the document control and audit apparatus 20, a means to periodically detect the location of the individual pages while traveling down the transport path is necessary. The RTC processor 130 is also used in the detection of jams in the document control and audit apparatus 20.

In the present embodiment, the real time clock is generated by the CPU 52 or the system timing clock associated with the CPU 52 as would be understood by one skilled in the art. The system clock is divided down to a value so that the RTC processor 130 can provide timing information so that the CPU 52 can request servicing every two milliseconds or 500 times per second.

The sensors 36, 38 and 40 sense when an item passes a particular location by sensing the characters printed on the item. Because the speed of the transport mechanism is fixed, the distance an item has traveled can be determined by the CPU 52. Every two milliseconds corresponds to an interrupt every one tenth of one inch of document motion by a given sensor in the present embodiment. When the real time clock period expires, an interrupt request is generated which causes the current program being run by the CPU 52 to halt and to pass control to an interrupt processor contained in the CPU 52. The CPU 52 reads the conditions of the various sensors 36, 38 and 40 and increments a plurality of software counters corresponding to the individual sensors. The counters are tested to see if maximum allowed values have been reached.

For example, if the first sensor's, sensor 36, counter exceeds a count of 100, the CPU 52 decides that a jam at the first sensor location 36 has occurred. Consequently, an appropriate flag or software indicator is set through use of the CPU 52 to indicate the jam. The flag is stored in memory accessible to other modules thereby providing a jam indication. This technique of testing counters by sensor location allows determination of the presence of or the absence of pages or of delayed pages with respect to each sensor and thus provides accurate knowledge of the location of pages within the document control and audit apparatus 20. In this way, real time knowledge of the physical location of each individual page of a document is obtained. The system executive or application executive may now need to act upon the condition of the document transport.

Initially, when the document control and audit apparatus 20 is powered up, an initialization program 134 is executed. The primary function of the initialization program 134 is to determine if the system is capable of running a job and to set certain initial system conditions. The initialization program 134 cooperates with the system executive 136. The system executive 136 acts as the main controlling software program for operating a number of software modules. The system executive module 136 operates with information received from the system and contains programming steps which control application specific procedures.

An application specific software executive 138 is included in the entire software package. The application specific software executive 138 is written so that specific job applications can be completed depending on the nature of the work to be done. The application specific software executive 138 is interdependent with the system executive 136 and operates in conjunction with a number of other specific program modules, as would be understood by those skilled in the art and shown here by a line 139 connecting the software packages.

A report generator software executive 140 includes software for managing the files which are created when the camera 34 reads the information from the various pages as they flow through the system and also generates and contains other information. The report generator software executive 140 also sets up output reports.

A job setup software executive 142 is used in this particular application as set-up software.

The software executive will send information to a motion control software 144. The motion control software 144 is directly coupled through a plurality of lines, here indicated as line 145 to a variety of hardware operators which include clutches, brakes, and motors here illustrated as a hardware block 146. The clutches, brakes and motors are used to control the flow of the documents and the individual pages as they travel down the transport path 24 for post-finishing operations. The hardware block 146 also includes the diverter 42, the double detector 30, and the sensors 36, 38 and 40.

The motion control software 144 is interrupt driven by the RTC processor 130. The motion control software executes based on the interrupts received and at that time looks at the hardware elements, the optical sensors, and the double detector 30. In this way, the locations and conditions of the items (e.g. double items) are monitored. Flags are set indicating the conditions.

The software executive programming interfaces with a number of software drivers. The software drivers are coupled to various pieces of hardware for controlling the operation of those individual hardware pieces. A man/machine input/output software driver 148 is coupled directly to the CRT/keyboard 67 through a line 149. The CRT/keyboard 67 is used as a man to machine interface for instructing the man/machine input/output software driver 148 of the various commands which are input through the keyboard by the user of the system. Additional information is input to program the document control and audit apparatus to perform application specific jobs. The man/machine input/output software driver 148 also sends information over the line 149 to the CRT/keyboard 46 informing the operator of the status of the system.

A file manager software driver 150 is coupled through a line 151 to a plurality of disk drives 152. The disk drives 152 store information which has been sent by the file manager 150 and send specific applications programs to the file manager 150. The disk drives 152 are included in mass storage 70. As illustrated, a hard copy software driver 154 is coupled through a line 155 to the line printer hardware 156. The line printer hardware includes the printer 74 as previously discussed which presents a hard copy of information to the operator. A non-impact printer input/output software driver 158 is coupled through a line 159 to a connection 160 on the non-impact printer. This connection provides various information to the software driver 158 and software executive.

The post-finishing input/output software driver 162 is coupled through a line 163 to the post-finishing connector 164. The post-finishing connector 164 represents a plurality of connectors which couple to hardware performing post-finishing operations. The post-finishing input/output software driver 162 is used to direct post-finishing operations which occur after the camera 34, which include collating, or determining if particular items are batch headers or trailers.

An optical character recognition (OCR) system software driver 168 is coupled to the camera 34 through a line 170. The OCR system software driver is programmed to recognize characters which are scanned by the camera 34. As different types of characters require different recognition techniques, the optical character recognition system software driver 168 contains programmed information which teaches the optical character recognition system how to recognize different types of characters.

Figure 6A:
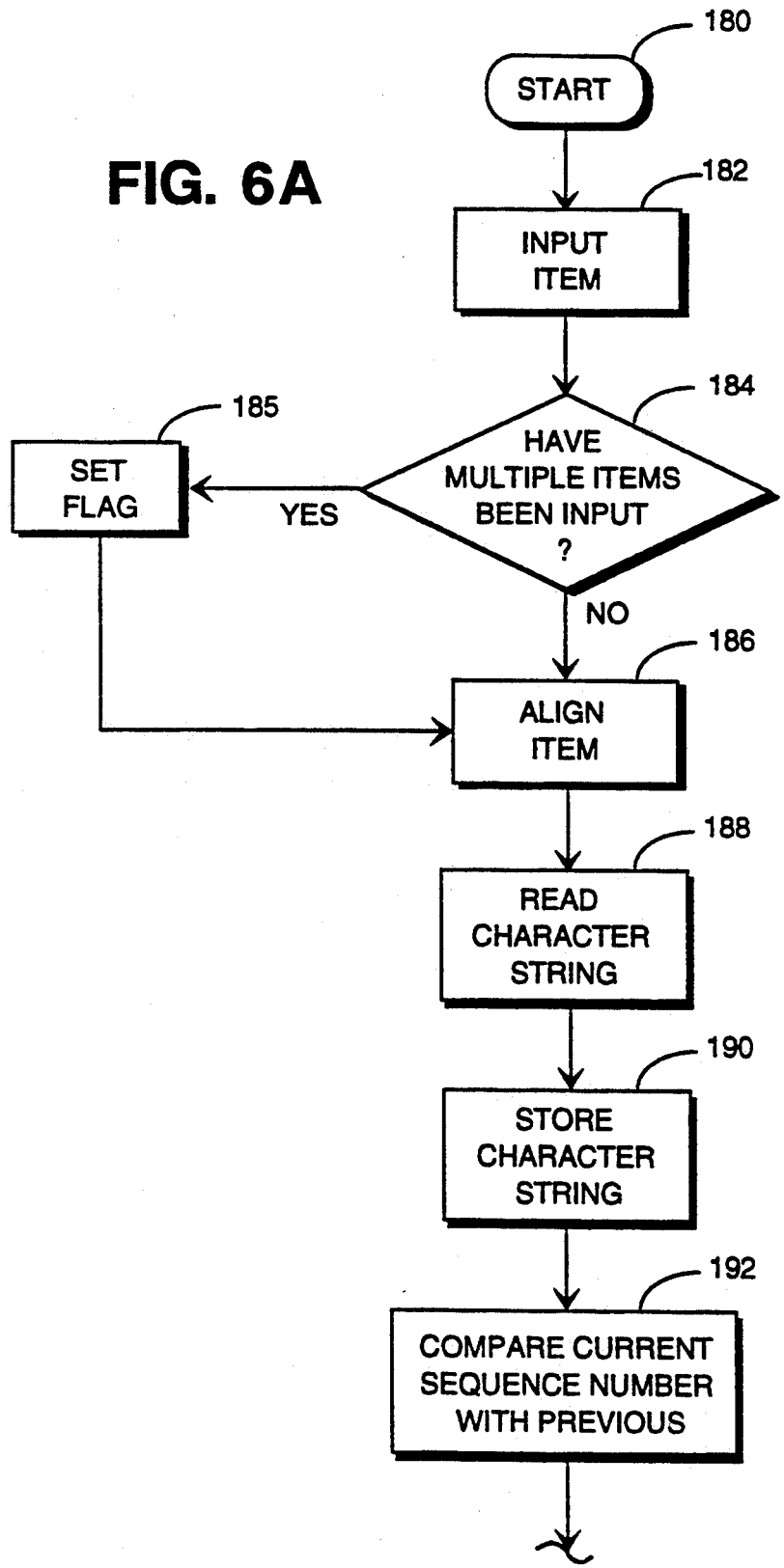
FIG. 6A and 6B are a flow chart illustrating one particular application of the present invention.
Figure 6B:
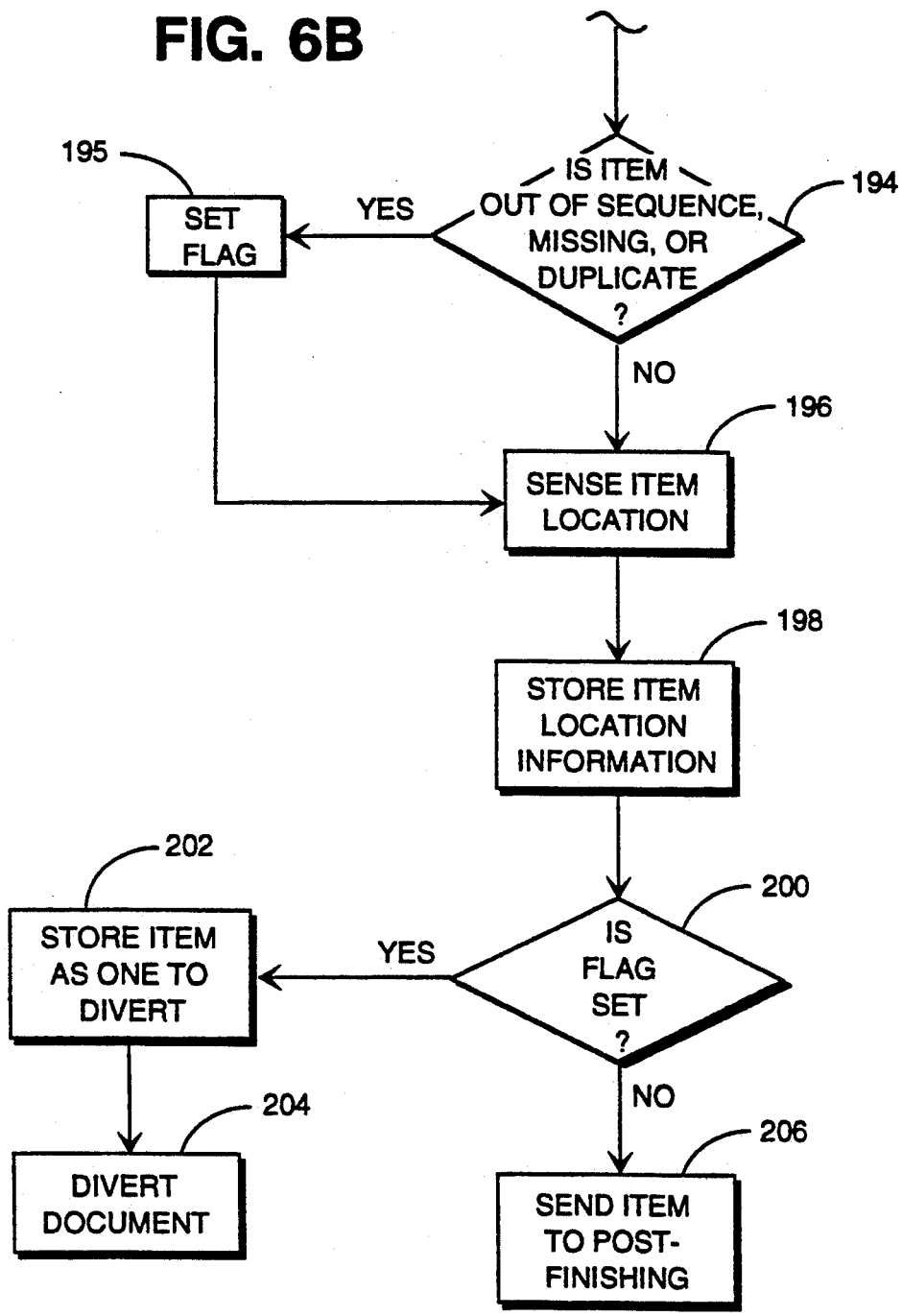

FIGS. 6A and 6B are an illustration of a flow chart of one particular application of the present invention. For the illustrated operation in the flowchart of FIGS. 6A and 6B, the Document Control and Audit Apparatus 20 has been programmed to perform a specific application. Because the present invention can be programmed to perform a variety of operations, the flowchart of FIG. 6A and 6B represents one possible sequence of operations which can be performed by the present invention.

In the example, the Document Control and Audit Apparatus 20 is programmed to perform the tasks of checking for double or multiple items at the input to the system and to check for out of sequence, missing, or duplicate items. These tasks are performed through the interaction of the motion control software 144, the system executive SE 136, the application specific SE 138, and the software drivers.

In the flowchart of FIG. 6A, the system begins at the start block 180 which would signify the power up of the system. Assuming the apparatus 20 has already been programmed to perform the previously mentioned tasks, an item is input into the apparatus at block 182. At decision block 184, the item input enters the double detector 30. At the double detector 30, the capacitance is measured as previously described. This information is read to determine whether the input item contains one or more items. Based on calculations by the CPU 52, the number of items is determined and a flag is set at block 185 if more than one item has been input to the apparatus 20. The flag is set in a memory location which can be accessed by the other modules of FIG. 5.

At block 186, the item enters the alignment device 32 for aligning the item in a position for reading by the camera 34. At block 188, the camera 34 reads the character string contained on the face of the item. The character string contains a sequence number which will be used later to determine whether the item are in sequence or if an item is missing or is a duplicate of a previous item. This information is sent through the video control unit 62 and to the CPU 52. At this time, the character string including the sequence number is stored as indicated by block 190 in the mass storage unit 70. Now the CPU 52 compares the previous sequence number with the current sequence number at block 192 to determine whether the items are in numerical sequence, or if the items are a duplicate, or if an item is missing. If so, the CPU makes a determination that the item does not conform to the previously programmed application at decision block 194 as illustrated at FIG. 6B. If the item is missing, out of sequence, or is a duplicate, a flag is set at a block 195.

In either case, the item now enters the sensor at block 196 which can determine document position under the control of interrupts as previously described. The item location information is now stored in memory as shown at block 198 and would be continually updated, under control of the interrupts. For purposes of description, only one sensor is used in this particular example. Of course any number of sensors can be used depending on the specific application.

Now that the location of the document is known with respect to the transport mechanism, the memory location storing the flag can be examined. The CPU 52 checks to see if the flag has been set as seen at decision block 200. If the flag is set, the location of the item is noted and it is marked as an item which must be diverted because it is either a double item, a duplicate item, a missing item, or an out of sequence item as previously determined and shown at block 202. Additional sensors under interrupt control continue to track the location of the items. Once the item is positioned at the diverter 42, the CPU 52 notifies the motion control software 144 that the item is to be diverted. Consequently, at block 204 the item is diverted into the bin 44.

The remaining items which have passed through the apparatus 20 up to this time without being flagged are then sent on to post-finishing as illustrated at block 206.

It is not necessary that the post finishing operations begin after the diverter, nor is it necessary that the number of optical sensors be limited in number or that the sensors be restricted to a location before the diverter. For instance, once an entire set of pages are collated into a document and inserted into an envelope, the envelopes could be diverted into a bin for a variety of reasons. The bin does not need to be dedicated to reject items, but a number of bins could be used in this instance to contain envelopes which are diverted and grouped according to zip code to improve mailing efficiency.

It is also possible to construct a variety of application specific procedures under the present invention. For instance, if only a single item is enclosed in an envelope the requirement for checking for out of sequence items is not necessary since a set of items is not being collated in order to comprise an entire document. In this case, the application specific software could be set up to only count the number of items produced. Additionally, the use of block and batch control documents as previously described could be incorporated in the application specific software. The application specific tasks are customized to the specific requirements of the user.

Each aspect of the invention being exemplary, the scope of the invention is not intended to be limited to the specific embodiments as shown or described. Instead, the scope of the invention is intended to encompass those modifications and variations that may be apparent to those persons skilled in the art to which the subject matter pertains.

What is claimed is:

1. An apparatus for monitoring and controlling printed sheet items for post-finishing processing and for creating a record of such items, each said item having printed thereon at least one character representing certain information about said item, said apparatus comprising:

a transport receiving said items and for sequentially conveying said items one at a time to a post-finishing operation;

a double-sheet detector mounted along said transport and positioned to detect multiple sheet items being conveyed together with one on top of another, said double-sheet detector generating a first electrical signal in accordance with said multiple sheet items;

a video sensor mounted along said transport and positioned to sense at least one said character printed on sheet items conveyed by said transport, said video sensor generating a second electrical signal in accordance with each of said sensed characters;

a processor coupled in circuit with said double-sheet detector and said video sensor, said processor generating and storing a record of the sheet items conveyed including the characters sensed for each item and generating a status signal based upon said first electrical signal and said sensed characters for selected items to be diverted away from said transport; and a diverter mounted along said transport and responsive to said status signal, said diverter diverting said selected items away from said transport.

2. An apparatus for monitoring and controlling a sequence of printed sheet items for post-finishing processing, each said item having printed thereon at least one character representing the position of that item within the sequence, said apparatus comprising:

a transport receiving said items and for sequentially conveying said items one at a time to a post-finishing operation;

a double-sheet detector mounted along said transport and positioned to detect multiple sheet items being conveyed together with one on top of another, said double-sheet detector generating a first electrical signal in accordance with said multiple sheet items;

a video sensor mounted along said transport and positioned to sense at least one said character printed on sheet items conveyed by said transport, said video sensor generating a second electrical signal in accordance with each of said sensed characters;

a processor coupled in circuit with said double-sheet detector and said video sensor, said processor responsive to said first electrical signal and said sensed characters and generating a status signal for first reject items being conveyed together with one on top of another and for second reject items that are out-of-sequence; and a diverter mounted along said transport and responsive to said status signal, said diverter diverting said first and second reject items away from said transport.

3. The apparatus of claim 2 wherein said processor comprises means for determining from said sensed character whether there is a sheet item missing from said sequence.

4. The apparatus of claim 2 wherein said processor comprises means for determining from said sensed character whether there is a duplicate sheet item within said sequence.

5. The apparatus of claim 2 wherein said processor comprises means for determining from said sensed character whether there is an unprinted sheet item within said sequence.

6. The apparatus of claim 2, further comprising means for generating and storing a record of the sheet items conveyed including the characters sensed for each item.

7. The apparatus of claim 2 wherein said double-sheet detector comprises means for measuring capacitance.

8. A method for monitoring and controlling a sequence of printed sheet items for post-finishing processing, each said item having printed thereon at least one character representing certain information about said item, said method comprising the steps of:

sequentially conveying said items one at a time along a transport to a post-finishing operation;

detecting whether multiple sheet items are being conveyed together with one on top of another and generating a first electrical signal in accordance with said multiple sheet items;

sensing at least one said character printed on sheet items conveyed along said transport and generating a second electrical signal in accordance with each of said sensed characters;

generating and storing a record of the sheet items conveyed including the characters sensed for each item;

generating a status signal based upon said first electrical signal and said sensed characters for selected items to be diverted away from said transport; and diverting said selected items away from said transport in response to said status signal.

* * * * *